UNITED STATES PATENT OFFICE.

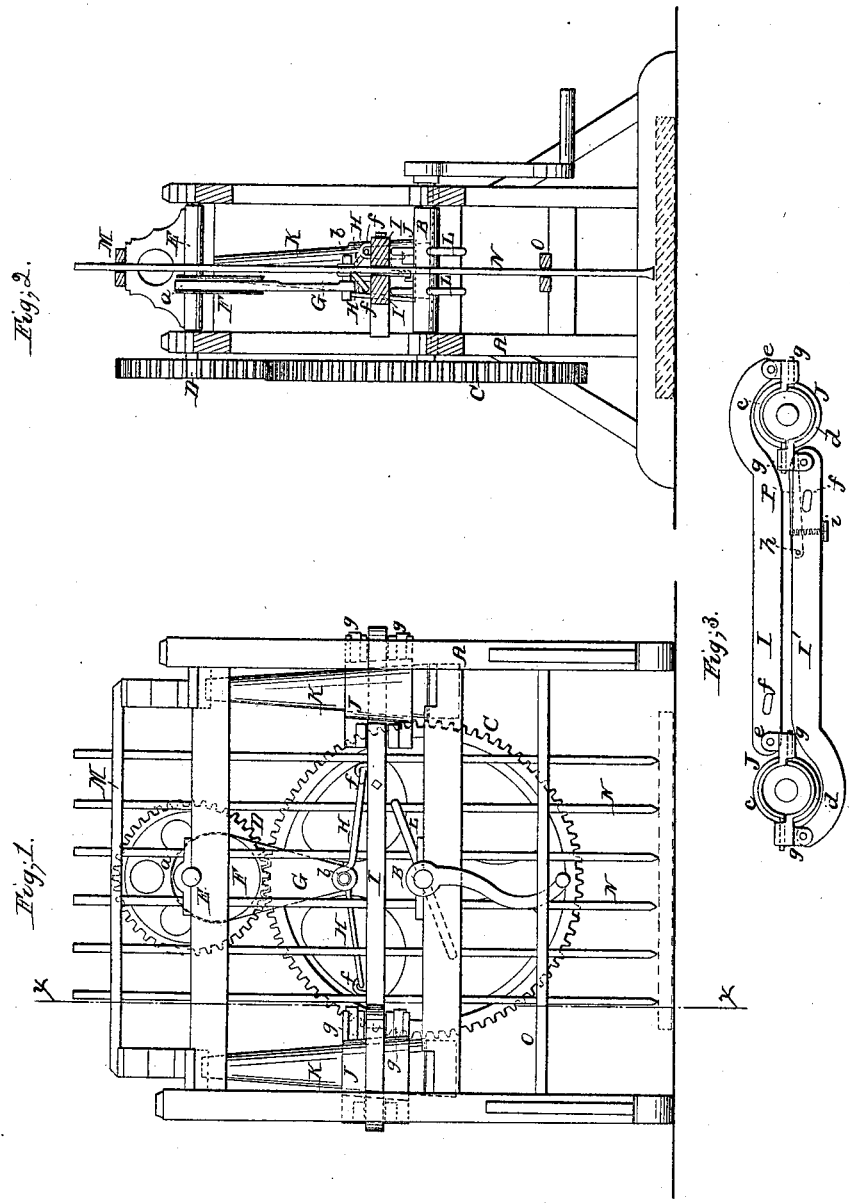

FRANCIS SCHWALM, OF JOLIET, ILLINOIS.

ROCK-DRILLING MACHINE.

Specification of Letters Patent No. 29,011, dated July 3, 1860.

*To all whom it may concern:*

Be it known that I, FRANCIS SCHWALM, of Joliet, in the county of Will and State of Illinois, have invented a new and Improved Rock-Drill; and I do hereby declare that the following is a full, clear, and exact description of the same, reference being had to the annexed drawings, making a part of this specification, in which—

Figure 1 is a front elevation of my invention. Fig. 2 a transverse sectional view of the same taken in the line $x$, $x$, Fig. 1. Fig. 3 a detached plan or top view of the clamping bars by which the drills are operated.

Similar letters of reference indicate corresponding parts in the several figures.

This invention has for its object the operating of a plurality of drills simultaneously by the rotating of a single shaft, and is more especially designed for operation on a large scale, as in mining and quarrying, where a series of holes are required to be drilled in a right line for the purpose of detaching by blasting large masses of rock in line or coincident with their cleavage or seams.

The invention consists in the employment or use of two clamp bars connected by joints to boxes placed on conical or taper guide bars and connected to a rising and falling arm substantially as hereinafter described, whereby the desired end is attained.

To enable those skilled in the art to fully understand and construct my invention I will proceed to describe it.

A represents a framing which may be of rectangular or other suitable form, and having a driving or power shaft B, fitted transversely in it at about its center. On one end of the shaft B, there is a spur wheel C, which gears into a pinion D, on one end of a shaft E, which shaft is placed on the upper part of the framing and has an eccentric F, on it at about its center. The eccentric F, is connected by a strap $a$, with an arm G. To the lower end of arm G, there is a pin $b$, attached, said pin has two rods H, H, connected to it, the outer ends of which are attached by bars I, I', one rod to each bar. The bars I, I', are horizontal and parallel with each other, and they are connected at their outer ends to boxes J, which are placed on conical or taper upright guides K, K, in the framing, one at each end of it.

The boxes J, J, are each formed of two equal and vertical parts $c$, $d$, and the bar I, has one end attached by a joint $e$, to the inner edge of the part $c$, of one box while its opposite end is attached by a joint $e$, to the outer edge of the part $c$, of the other box. The bar I', has its ends similarly attached to the parts $d$, of the boxes, but in a reverse manner, that is to say, the points of attachment of the bars to each box are at opposite sides as shown clearly in Fig. 3.

The outer ends of the rods H, H, are connected one to each bar I, by means of eyes $f$, the outer end of the rods H, being of hook-form to fit into the eyes, see Figs. 1 and 2.

The two parts $c$, $d$, of the boxes J, J, are connected by dovetail sliding joints $g$, which admit of a certain degree of lateral play or movement of the two parts $c$, $d$, of each box, and at the same time keep said parts connected in proper position.

Through the shaft B, two arms L, L, pass and project at equal distances from each side. The arms L, are placed in line, one with each bar I, I', as shown clearly in Fig. 2, and said arms are in the same plane.

On the upper parts of the framing A, there is placed a longitudinal bar M, perforated and through which the drills N, pass, one through each hole, said bar M, serving as a guide for the drills. A similar bar O, is also placed in the lower part of the framing.

To the inner side of the bar I', there is connected by a joint $h$, a bar P. This bar is fitted in a recess in the inner side of bar I', and may be adjusted a requisite distance out from said bar I', or drawn wholly within it by means of a screw $i$.

The operation is as follows: The framing A, is placed over the spot designed to be operated on, and the shaft B, is rotated by any convenient power. Motion is communicated from the shaft B, to shaft E, by means of the gearing C, D, and the eccentric F, gives a rising and falling motion to the arm G. As the arm G, ascends its rods H, H, draw upward the bars I, I', and cause the latter to grip or clamp the drills N, the gripping or clamping being due to the points of attachment of the rods H, to the bars I, I', and a sliding movement of the parts $c$, $d$, of the boxes J, as well as a turning movement of the latter on the uprights K. When the bars I, I', reach their highest point of ascent, the arms L, L, come in contact with the under sides of the bars I, and elevate the same so that they will be relieved of the pull of the rods H, and the drills then descend by their own gravity. The bars I, I', also descend and are again raised and made to clamp and elevate the drills.

The forming of the boxes J, of two parts connected by sliding joints $g$, and fitted on the conical uprights K, K, admit of the lateral clamping and disengaging movement of the bars I, I', as before stated; the taper form of the uprights corresponding with the varying dimensions of the interior of the boxes due to the lateral movement of the bars I, I'.

Any number of drills N, may be used according to the size of the machine. By adjusting the bar P, drills of different diameters may be employed. One or more of these bars may be employed and when not required for use they may be adjusted in the bars flush with the inner sides.

I would remark that if desired the uprights K, may be of polygonal form and arranged so as to turn in bearings instead of the boxes turning on the uprights as described. This however would be but an equivalent of the device first described.

I am aware that clamp bars have been used and arranged in various ways for the purpose of elevating the drills of rock-drilling machines; and I do not claim broadly the employment or use of clamps or clamp bars irrespective of the arrangement herein shown and described. But I do claim as new and desire to secure by Letters Patent—

1. The clamp bars I, I', when attached to the boxes J, which are formed of two laterally sliding parts $c$, $d$, fitted on conical or taper uprights K, and operated through the medium of the rods H, H, and arms L, L, G, substantially as and for the purpose set forth.

2. The adjustable bar P, one or more, when applied to the bars I, I', substantially as shown to admit of the simultaneous employment of drills of varying diameter.

FRANCIS SCHWALM.

Witnesses:
   Thos. O'Neill,
   Thomas Conroy.